US006725974B2

(12) United States Patent
Sato et al.

(10) Patent No.: US 6,725,974 B2
(45) Date of Patent: Apr. 27, 2004

(54) BALANCER SHAFT APPARATUS FOR AN ENGINE

(75) Inventors: Masaaki Sato, Aku-gun (JP); Sakumi Haseto, Aku-gun (JP); Ichirou Hirose, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/078,464

(22) Filed: Feb. 21, 2002

(65) Prior Publication Data

US 2002/0112921 A1 Aug. 22, 2002

(30) Foreign Application Priority Data

Feb. 22, 2001 (JP) ....................................... 2001-046638

(51) Int. Cl.[7] ................................................ F16N 31/00
(52) U.S. Cl. ...................... 184/106; 184/6.5; 123/192.2
(58) Field of Search ............... 184/6.5, 106; 123/192.1, 123/192.2, 196 R

(56) References Cited

U.S. PATENT DOCUMENTS 4,703,724 A * 11/1987 Candea et al. ........... 123/192.2
4,703,725 A * 11/1987 Weertman ................ 123/192.2
5,535,643 A * 7/1996 Garza .......................... 74/603
6,471,008 B1 * 10/2002 Iwata ......................... 184/106
2003/0075136 A1 * 4/2003 Inaba et al. .............. 123/192.2

FOREIGN PATENT DOCUMENTS

JP 62-28937 U 2/1987
JP 2000104790 * 4/2000
JP 2001280110 * 10/2001
JP 2002250399 * 9/2002

* cited by examiner

*Primary Examiner*—David Fenstermacher
(74) *Attorney, Agent, or Firm*—Nixon Peabody LLP; Donald R. Studebaker

(57) ABSTRACT

A balancer shaft apparatus efficiently prevent oil from being stirred in the oil pan and from being splashed into the cylinder block during the balancer-shaft rotation. Oil in a housing of the balancer shaft is discharged from a drainage hole formed at such a location above an oil level as to contact a base serving as a bearing beam of a crankshaft supporting member. The discharged oil hits inner surfaces of a recess formed on the lower portion of the crankshaft supporting member to form oil drops, returning to an oil pan. The housing is provided with guide passages connecting the drainage holes to a space in which the balancer shaft is disposed for draining the oil. These guide passages are formed with tapered guide surfaces for orienting the oil towards the lower portions of the crankshaft supporting member while splashed oil caused by the balancer-shaft rotation is drained through the drainage holes.

12 Claims, 9 Drawing Sheets

BALANCER SHAFT APPARATUS FOR AN ENGINE

TECHNICAL FIELD OF THE INVENTION

The present invention relates to a balancer shaft apparatus for an engine which cancels vibration caused by crankshaft rotation.

BACKGROUND OF THE INVENTION

In the past, problems associated with engine balancer shafts have been known. For example, the balancer shaft rotates to stir oil in an oil pan, causing the generation of bubbles in the oil or the foaming of the oil, so that the lubricity of the oil is reduced. This stirring also occasionally causes the oil to be splashed into a cylinder block and especially into a crankcase of the engine.

In an effort solve the problem noted above, a variety of proposals have been made. For example, Publication of Japanese Utility Model application No. S62-028937, which is a previous application by the applicant of the present application for patent, discloses a technology in which a balancer shaft is contained in a housing, and a drainage hole is provided on a side wall of the housing for discharging balancer-shaft lubricating oil collected in the housing according to the balancer-shaft rotation.

With the above technology, the stirring and the splashing of the oil in the oil pan caused by the balancer shaft rotation is avoided. In this case, however, another problem arises in that discharged oil in liquid form or in mist form may enter into the cylinder block and especially into the crankcase, consequently, being splashed further by the crankshaft rotation.

SUMMARY OF THE INVENTION

The present invention seeks to effectively solve the above mentioned problem, and its object is to provide a balancer shaft apparatus for an engine which efficiently prevents the oil from being stirred in the oil pan during the balancer-shaft rotation and from being splashed into the cylinder block.

To achieve the above object, according to an aspect of the present invention, there is provided a balancer shaft apparatus for an engine, comprising, a bearing beam supporting a crankshaft of the engine and disposed below a cylinder block of the engine, an oil pan for storing lubricating oil for the engine and located below the bearing beam, a balancer shaft housing disposed in the oil pan and containing and rotatably supporting a balancer shaft therein, and a drainage hole formed on the housing and so located above an oil level in the oil pan as to confront the bearing beam, for discharging the oil from the housing into the oil pan during balancer shaft rotation.

Accordingly, oil stir, caused by the discharging of the oil from the housing into the oil pan, is effectively prevented, and oil splash is effectively prevented by the bearing beam as an existing part because the oil is discharged from the housing through the drainage hole located above an oil level in the oil pan during the rotation of the balancer shaft.

These and other objects, features, aspects, and advantages of the present invention will become more apparent from the following detailed description of the preferred embodiments relative to the accompanied drawings.

DETAILED DESCRIPTION OF THE INVENTION

Figure 1:
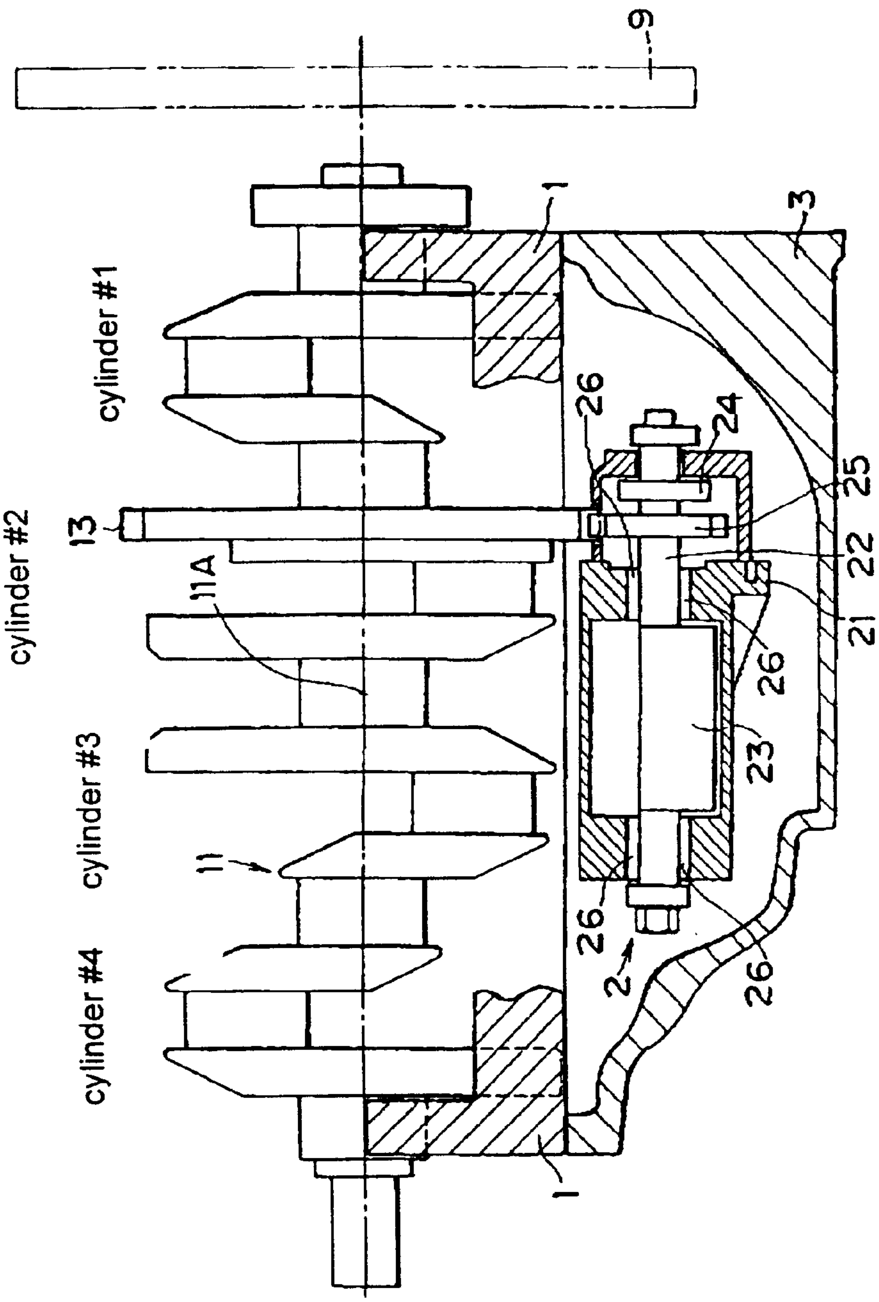
FIG. 1 shows a lower structure of an in-line four-cylinder engine equipped with a balancer shaft apparatus for an engine according to a preferred embodiment of the present invention.

A balancer shaft apparatus for an engine according to the present invention will described below in detail with reference to a preferred embodiment as illustrated in the drawings.

Figure 3:
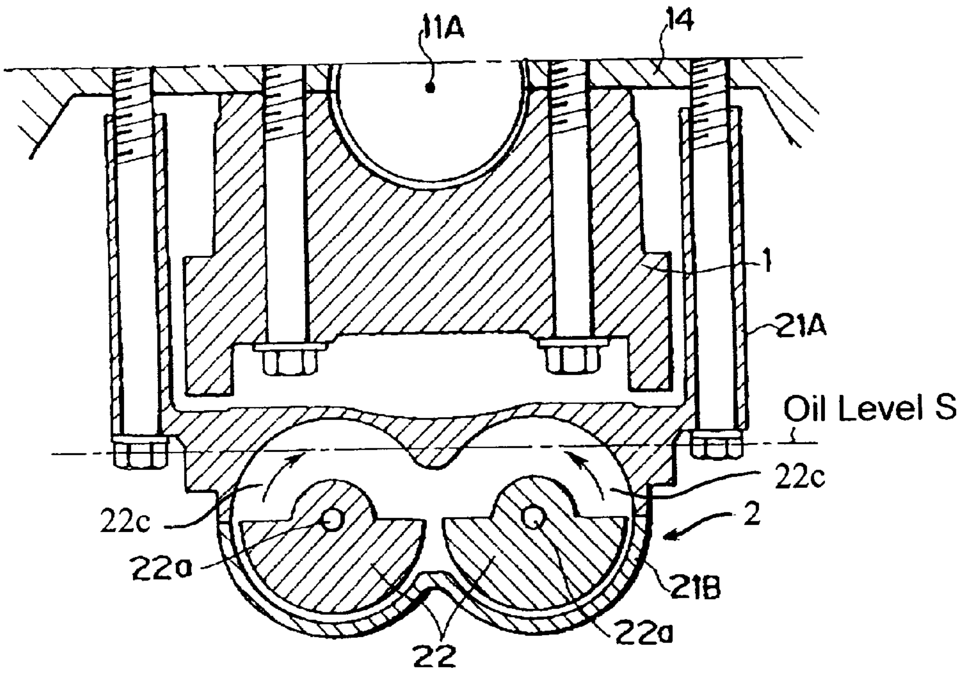
FIG. 3 is a cross-sectional view taken along a line III—III in the FIG. 2 with the balancer shaft apparatus attached to a cylinder block.

Inside an oil pan 3 of the in-line four-cylinder gasoline engine shown in FIG. 1, a crankshaft supporting member 1 and the balancer shaft apparatus 2 are disposed at the bottom of the cylinder block 14 (refer to FIG. 3). The crankshaft supporting member 1 is integrally formed with a plurality of supporting portions (or bearing caps) for rotatably supporting a crankshaft 11 and bearing beams as bases of them. Additionally, below the crankshaft supporting member 1, a housing 21 of the balancer shaft apparatus 2 is supported.

Figure 4:
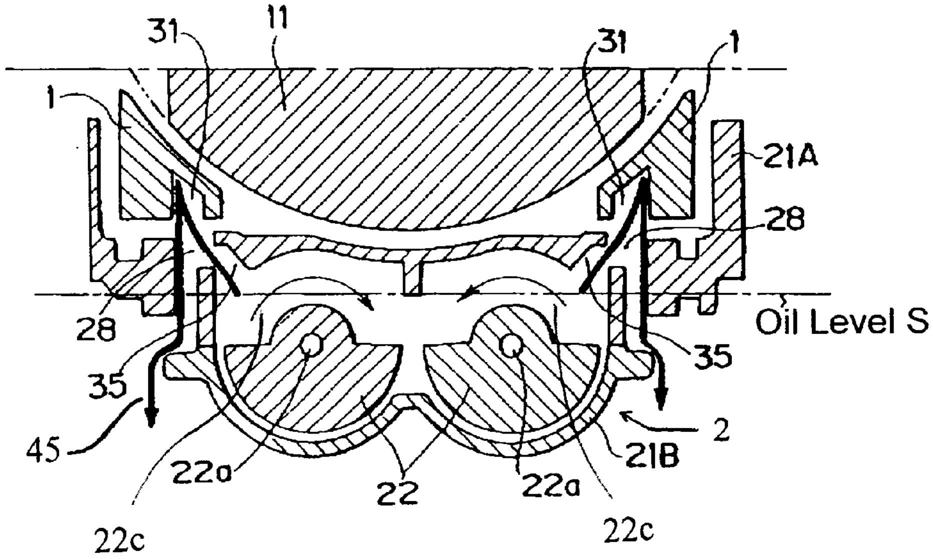
FIG. 4 is a cross-sectional view taken along a line IV—IV in the FIG. 2 with the balancer shaft apparatus attached to a cylinder block.

To facilitate assembly of the balancer shaft 22 and a bearing 26, etc, the housing 21, as shown in FIG. 3 and FIG. 4, consists of an upper housing 21A and lower housing 21B separated along the axis 22*a* of a balancer shaft 22, which are secured to each other via a plurality of bolts not shown. Two balancer shafts 22 are rotatably supported by this housing 21, separated by a prescribed interval and in parallel to the axis 11 A of the crankshaft 11. Note that the balancer shaft rotational arrows are denoted by element 22*c* in FIGS. 3 and 4.

Each balancer shaft 22 is integrally formed with a balancer weight 23 and a counter gear 24. Each balancer shaft 22 is supported by two bearings 26 disposed at the axially opposite ends of the balancer weight 23. The two balancer shafts 22 are engaged via counter gears 24 formed on both shafts so that power is transmitted from one to another.

In addition, one of the balancer shafts 22 is coaxially provided with a driven gear 25 engaging a drive gear 13 of the crankshaft 11, so that driving force is transmitted from the crankshaft 11 to the balancer shaft 22, causing both the balancer shafts 22 to rotate with the crankshaft 11 in the direction indicated in FIG. 3 and FIG. 4.

A flywheel 9 is coaxially positioned at the downstream side in the same direction as the power transmission from the crankshaft 11 to a transmission device (not shown), and the drive gear 13 is disposed at the flywheel side on the crankshaft 11 (between the third cylinder and the fourth cylinder in this embodiment), where the crankshaft 11 has less torsion.

In this embodiment, the balancer shaft apparatus 2 is provided with drainage holes 28 for discharging or returning oil in the housing 21 containing the balancer shaft body to the oil pan 3 during the balancer-shaft rotation 22. These drainage holes 28 are formed at such a location as to confront the crankshaft supporting member 1 above an oil level S in the oil pan 3.

Additionally, as shown in FIG. 4, the housing 21 is provided with guide passages 35 connecting the drainage holes 28 to a space in which the balancer shaft 22 (rotational area) is disposed for draining the oil. These guide passages 35 are formed with a tapered guide surface for orienting the oil towards to the lower surface of the crankshaft supporting member 1 while splashed oil caused by the balancer-shaft rotation is drained through the drainage holes 28. In this embodiment, according to the structure, splashed oil by the rotation of the balancer shaft 1 is reliably guided out of the housing 21 through the drainage holes 28. Note that the oil flow is denoted by element 45 in FIG. 4.

Moreover, at the bottom face of the base serving as a bearing beam of the crankshaft supporting member 1, recesses 31 receding upwardly are provided, and the drainage holes 28 are formed at such locations as to confront the recesses 31. Hereinafter, the structure of the crankshaft supporting member 1 will be described.

Figure 6:
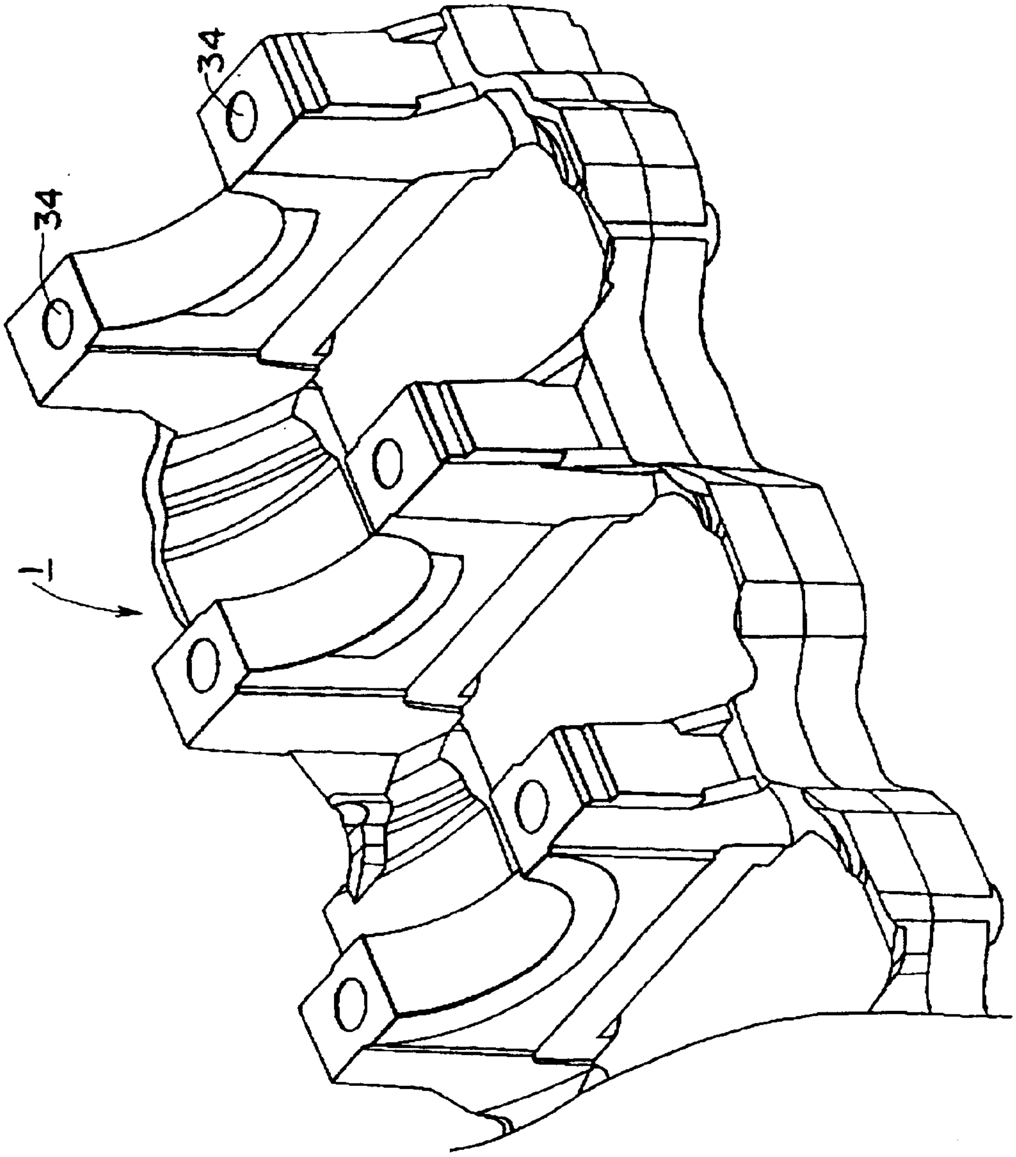
FIG. 6 is a perspective view of the crankshaft supporting member in accordance with the present invention.
Figure 7:
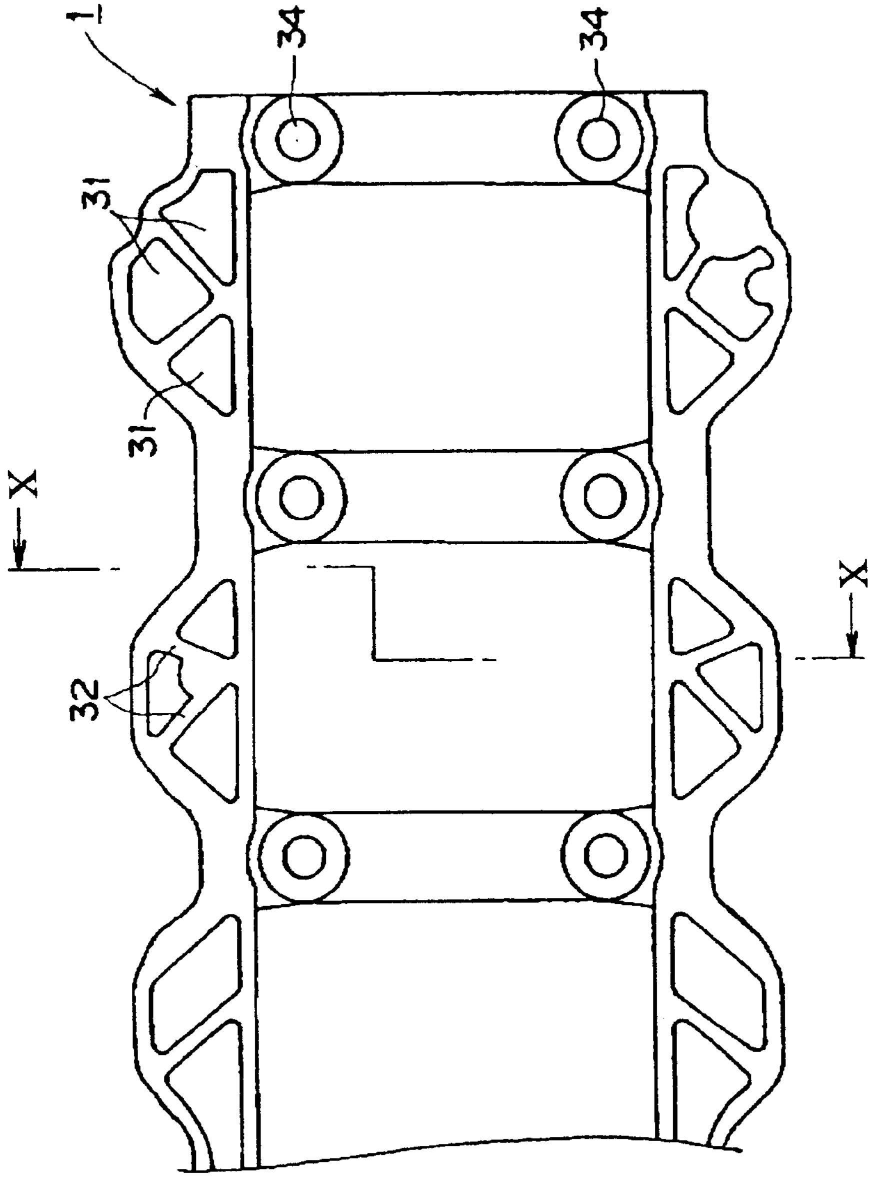
FIG. 7 is a bottom plan view of the crankshaft supporting member in accordance with the present invention.
Figure 8:
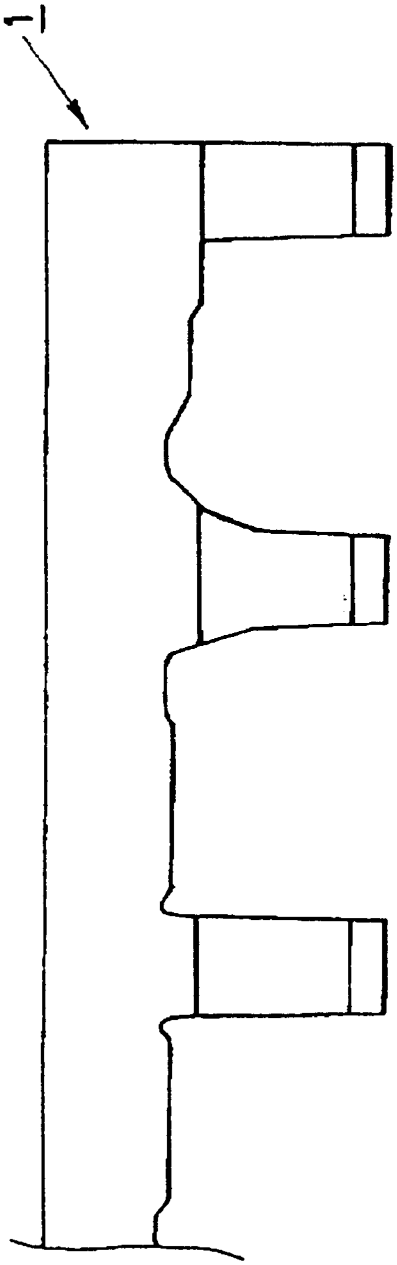
FIG. 8 is an elevational view of the crankshaft supporting member in accordance with the present invention.
Figure 9:
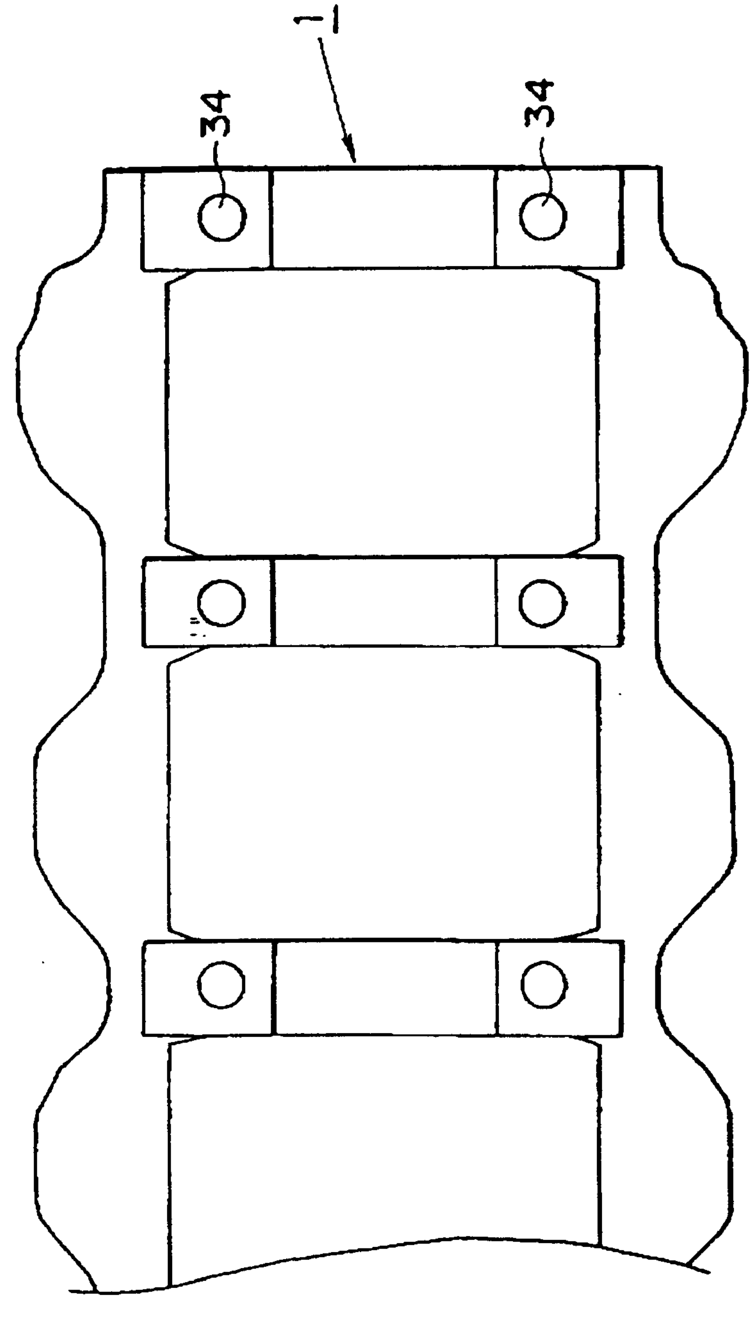
FIG. 9 is a top plan view of the crankshaft supporting member in accordance with the present invention.
Figure 10:
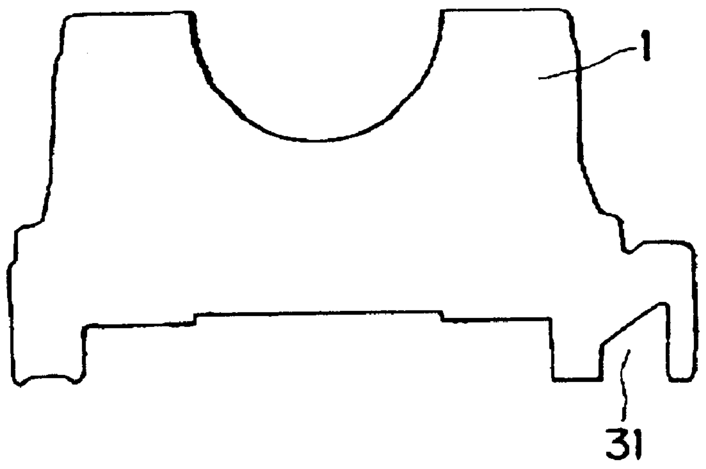
FIG. 10 is a cross-sectional view taken along a line X—X in FIG. 7.

As shown in FIG. 6 and FIG. 8, the crankshaft supporting member 1 is integrally formed with bearing beams and a plurality of bearing caps for rotatably supporting the crankshaft 11, as described above with reference to FIG. 3. The base serving as the bearing beam of the crankshaft supporting member I is provided with recesses 31 recessed upwardly as shown in FIG. 4, FIG. 7, and FIG. 10, and inner side surfaces forming the recesses 31 constitute vertical wall surfaces. These recesses 31 are formed in enlarged portions on the outer surfaces of the crankshaft supporting member 1. Wall surfaces forming the inner side surfaces of the recesses constitute ribs 32 which connect the outer portion of the enlarged portions with the crankshaft supporting member 1 in a truss formation. In accordance with this embodiment, the lightweight construction is achieved over that of conventional bearing beams without reducing rigidity of the base of the crankshaft supporting member 1. Bosses 34 are used for securing the crankshaft supporting member 1 to the bottom of the cylinder block 14 via bolts as illustrated in FIG. 3.

Figure 2:
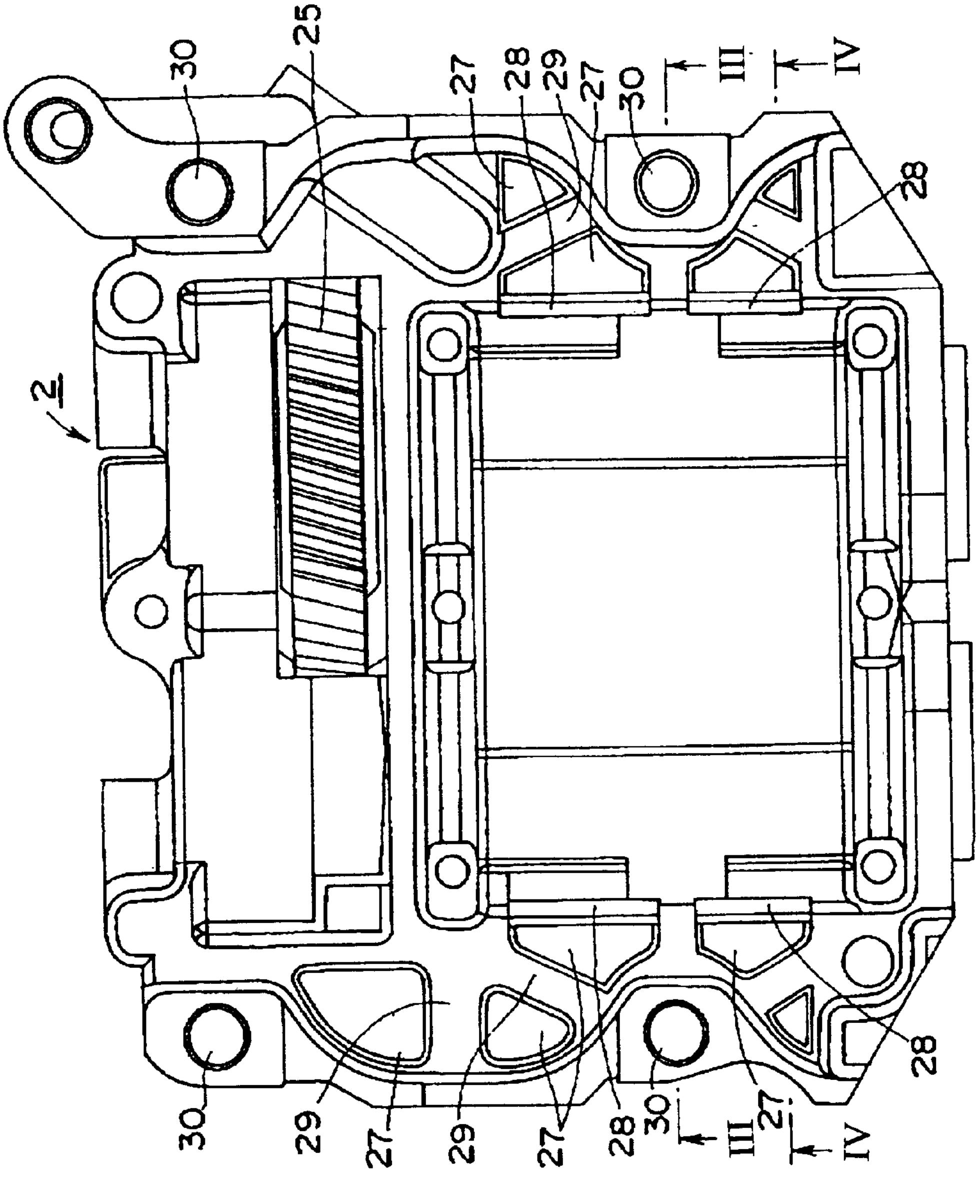
FIG. 2 is a top plan view of the balancer shaft apparatus.

In addition, on the outside of the drainage holes 28 on the housing 21, as shown in FIG. 2, hollow portions 27 extending vertically as vertical passages are formed so that the discharged oil from each of four drainage holes 28 directed into the oil pan 3 during the oils decent in the form of oil drops after hitting against the inner side surfaces of the recesses 31.

Figure 5:
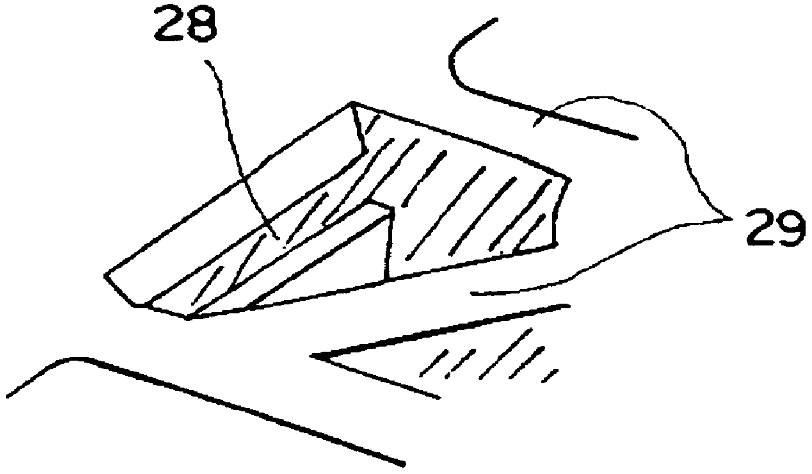
FIG. 5 is a perspective view of a portion of the balancer shaft apparatus in accordance with the present invention.

FIG. 5 is a perspective view showing the drainage holes 28 and the ribs 29 formed on the housing 21. As shown in FIG. 5 and FIG. 2, vertical walls of the hollow portions 27 are integrated with the housing 21 and constitute vertical ribs. In accordance with the structure illustrated in this embodiment, a lightweight housing is achieved over that of conventional housings without reducing rigidity.

That is, because the base serving as the bearing beam of the crankshaft supporting member 1 is formed with the recesses 31 and the housing 21 is formed with the hollow portions 27 as described above, the inner side surfaces of the recess 31 formed on the crankshaft supporting member 1, and the vertical walls which are formed on the crankshaft supporting member 1 and constitute the hollow portions 27 in the housing 21, form communicating passages for directing the oil which descends therefrom in the form of oil drops after hitting against the inner surfaces of the recesses 31 in the condition where the housing is secured to the cylinder block 14 via the bosses 30 and the crankshaft supporting member 1 is secured to the cylinder block 14 via the bosses 34. Therefore, the oil dropped out of the recesses 31 is reliably guided into the oil pan 3.

According to the embodiment described above, oil stir in the oil pan is effectively prevented because the oil is discharged through the drainage hole 28 located above an oil level S in the oil pan 3 during to the rotation of the balancer shaft 22, then the discharged oil descends through the communicating passage consisting of the recess 31 and the hollow portion 27.

Additionally, in this embodiment, the crankshaft supporting member may be integrated with the bearing beam and the bearing cap as existing engine parts and recesses 31 are provided on the base (bearing beam portion). Thus, oil discharged through the drainage holes 28 descends downwardly in the form of oil drops after hitting wall surfaces of the corresponding recess 31, so that oil splash into the cylinder block is effectively prevented.

In this embodiment, oil discharged from the drainage holes 28 forms oil drops once hitting wall surfaces of the recess 31. However, as an alternative, oil may be prevented from splashing into the cylinder block by a structure in which oil hits the lower portion of the crankshaft supporting member 1 without utilizing recesses 31, as well.

In addition, in this embodiment, the crankshaft supporting member 1 is integrally formed with a plurality of supporting portions (or bearing caps) for rotatably supporting the crankshaft 11 and bearing beams as bases of them, however the present invention may be adopted to a crankshaft supporting member consisting of a plurality of bearing caps and a bearing beam as separate parts. That is, in the case of such a separate structure, the recesses 31 may be formed so as to confront the drainage holes 28 on the lower portion of the bearing beam or the bearing cap.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of the present invention.

What is claimed is:

1. A balancer shaft apparatus for an engine, comprising, a crankshaft supporting member supporting a crankshaft of the engine and disposed below a cylinder block, the crankshaft supporting member being integrally formed with a plurality of bearing caps for rotatably supporting the crankshaft and a bearing beam base for connecting the bearing caps, an oil pan for storing lubricating oil for the engine and located below said crankshaft supporting member, a balancer shaft housing disposed in said oil pan and containing and rotatably supporting a balancer shaft therein, and a drainage hole formed on said housing above an oil level in said oil pan, for discharging the oil from said housing into said oil pan during balancer shaft rotation, wherein a recess receding upwardly is provided at a bottom face of said bearing beam base, said drainage hole is disposed at such a location as to confront the recess such that the oil discharged from said drainage hole hits against an inner side surface of the recess and thereby drops downwardly.

2. A balancer shaft apparatus for an engine as defined in claim 1, further comprising:

a guide passage connecting said drainage hole to a space in which the balancer shaft is disposed in said housing, and including at least one guide surface for orienting the discharged oil towards the lower surface of said bearing beam through said drainage hole.

3. A balancer shaft apparatus for an engine as defined in claim 1, wherein said recess includes vertically extending inner side surfaces extending vertically.

4. A balancer shaft apparatus for an engine as defined in claim 3, further comprising:

an enlarged portion formed on an outer surface of said bearing beam, wherein said recess is formed in said enlarged portion so that its inner side surfaces constitute ribs in a truss formation within said enlarged portion.

5. A balancer shaft apparatus for an engine as defined in claim 3, further comprising:

a vertical passage formed in said housing and on an outside of said drainage hole, wherein said recess and said vertical passage so communicate such that discharged oil through said drainage hole is oriented into said oil pan during descending out of the lower surface of said bearing beam.

6. A balancer shaft apparatus for an engine as defined in claim 5, wherein inner side surfaces of said vertical passage constitute ribs integrally formed on the housing.

7. A balancer shaft apparatus for an engine, comprising, a crankshaft supporting member supporting a crankshaft of the engine and disposed below a cylinder block, the crankshaft supporting member being integrally formed with a plurality of bearing caps for rotatably supporting the crankshaft and a bearing beam base for connecting the bearing caps, an oil pan for storing lubricating oil for the engine and located below said crankshaft supporting member, a balancer shaft housing disposed in said oil pan and containing and rotatably supporting a balancer shaft therein, and a drainage hole formed on said housing above an oil level in said oil pan for discharging the oil from said housing into said oil pan during balancer shaft rotation, wherein a recess receding upwardly is provided at a bottom face of said bearing beam base, a hollow portion extending vertically is formed on an outside of said drainage hole on said balance shaft housing, said drainage hole is disposed at such a location as to confront the recess such that the oil discharged from said drainage hole hits against an inner side surface of the recess and thereby drops downwardly through the hollow portion into said oil pan.

8. A balancer shaft apparatus for an engine as defined in claim 7, wherein said recess includes vertically extending inner side surfaces extending vertically.

9. A balancer shaft apparatus for an engine as defined in claim 8, further comprising:

an enlarged portion formed on an outer surface of said bearing beam, wherein said recess is formed in said enlarged portion so that its inner side surfaces constitute ribs in a truss formation within said enlarged portion.

10. A balancer shaft apparatus for an engine as defined in claim 8, further comprising:

a vertical passage formed in said housing and on an outside of said drainage hole, wherein said recess and said vertical passage so communicate such that discharged oil through said drainage hole is oriented into said oil pan during descending out of the lower surface of said bearing beam.

11. A balancer shaft apparatus for an engine as defined in claim 10, wherein inner side surfaces of said vertical passage constitute ribs integrally formed on the housing.

12. A balancer shaft apparatus for an engine as defined in claim 7, further comprising:

a guide passage connecting said drainage hole to a space in which the balancer shaft is disposed in said housing, and including at least one guide surface for orienting the discharged oil towards the lower surface of said bearing beam through said drainage hole.

* * * * *